April 19, 1960     H. FRIEDMAN     2,933,601

ELONGATED LIQUID LEVEL GAUGE

Filed Dec. 16, 1954

*INVENTOR.*
HERBERT FRIEDMAN
BY

United States Patent Office 2,933,601
Patented Apr. 19, 1960

2,933,601

ELONGATED LIQUID LEVEL GAUGE

Herbert Friedman, Arlington, Va., assignor, by mesne assignments, to J. J. Maguire, trading as J. J. Maguire Company, Washington, D.C.

Application December 16, 1954, Serial No. 475,610

3 Claims. (Cl. 250—43.5)

This invention relates generally to liquid level gauges for containers and particularly to gauges of the type which employ radioactive radiations for the determination of liquid level.

Radiation type liquid level gauges are known in which the absorption of radiation by a mass of liquid is utilized to obtain an indication of the surface level thereof. The indications obtained with such arrangements depend upon a number of factors which may vary to influence the accuracy of the indication. Where the indication is obtained as the summation of energy from a plurality of sources which is incident at a particular location, low sensitivity obtains. Any variations in the contribution of each component to the total detected energy result in a cumulative error in the detected liquid level.

An object of the present invention is to provide an improved radiation type liquid level gauge.

Another object is to provide a liquid level gauge having source and detector arrangements which provide improved accuracy and sensitivity of measurement.

Another object is to provide liquid level radiation gauges having positive indication which may be remote from the detector unit.

A further object is to provide an indicating gauge having discrete indicators of the level of a liquid.

These and other objects are accomplished by the arrangements described herein with elongated radiation sources and detectors and combinations thereof which are vertically disposed with respect to the liquid container. For obtaining indication remote or local of discrete levels of liquid in a container a plurality of detectors are provided with indication circuits individual thereto.

Figure 1:
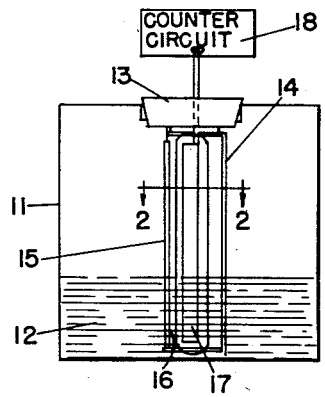
Fig. 1 is an elevation view of the interior of a container with one form of liquid level gauge in accordance with the invention.

Referring now to Fig. 1, the invention is shown as generally disposed in a container 11 for indicating the level of liquid 12 contained therein. The container 11 may be fitted with a cap 13 from which depends a U-shaped bracket 14. The U-shaped bracket 14 supports an elongated strip or rod 15 which has an inner surface 16 coated with a radioactive material. Also supported by the U-shaped bracket is an elongated detector tube 17 of the Geiger type or other well known detector for radio active emissions. The tube 17 is arranged substantially parallel to the source 16 and is preferably approximately coextensive therewith.

The radioactive source 16 is one which emits beta rays, such as $C^{14}$ or strontium 90, and the detector 17 is selected for sensitivity to beta rays and spaced from the source 16 a distance such that a high energization level obtains when the medium therebetween is of low density such as vapor or air. Using a source 16 composed of strontium 90 and a beta ray detector, a spacing between the source 16 and the detector 17 of one cm. will provide a high level of energization of the detector in an air medium but will result in completely preventing energization of the detector at those portions where a liquid is present between source 16 and detector 17. With this arrangement the energization level of the detector 17 will be inversely proportional to the height of the liquid 12 in the tank 11 and by a conventional power supply and measuring circuit 18 the magnitude of energization can be indicated. For any particular arrangement the indicator scale can be calibrated in volume units.

Figure 2:
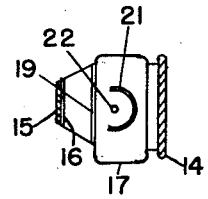
Fig. 2 is a sectional view taken along the lines 2—2 of Fig. 1.

In Fig. 2 the arrangement of the depending portion of the gauge is shown. The U-bracket 14 may be formed of any suitable material and supports the strip 15 carrying the radioactive coating 16 and the detector 17. The detector 17 has an energy permeable window 19 and internal electrodes in the form of a U 21 and an axial wire 22. The tube 17 thus receives substantially the full radiation from the source 16 unless it is interrupted by an intervening absorbing liquid.

Figure 3:
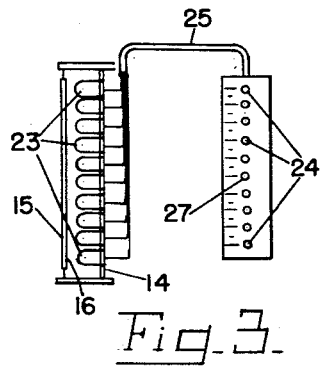
Fig. 3 is a view showing a modification having a discrete level indicator.
Figure 4:
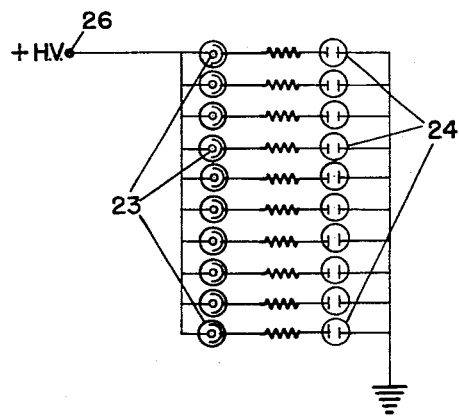
Fig. 4 is a schematic diagram of the detectors and indicators of Fig. 3.

In Fig. 3 a modified form of the invention provides individual detector tubes 23 vertically supported on the bracket 14 and directed to receive radiations from the source 16. The detectors 23 are individually connected with indicators 24 which may be remotely located via cable 25. A circuit suitable for the operation of the detectors 23 and the indicators 24 is shown in Fig. 4 in which a common high voltage supply 25 is applied to one electrode of the Geiger tube 23. The other electrodes of the tubes 23 are respectively connected, via cable 25 if desired, through protective resistors to individual current indicators 24. Ordinarily small neon lamps are preferably used for the indicators 24. With the circuit described the empty portion of the tank 11 will be indicated by glowing neon lamps 24 while the portion containing the liquid 12 will show lamps 25 dark. If desired, the panel for the lamps 24 can be calibrated with a suitable scale 27.

Figure 5:
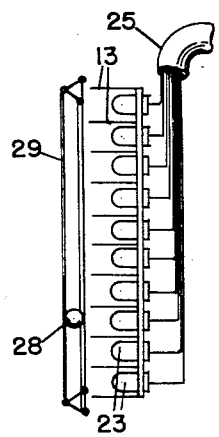
Fig. 5 shows another modification.

Fig. 5 shows a detector having as a radioactive source a ball float 28 which is coated with suitable emissive material. The ball is constrained by a cage 29 to move vertically in front of the detectors 24 and floating on the surface of the liquid 12. With the detectors 23 arranged as shown in Fig. 3 those tubes on the level of the float 28 and above would receive energy therefrom and the indicators 24 associated therewith via cable 25 would be illuminated at progressively lower levels above the float 28. The detector 23 opposite the ball 28 will be energized at the highest level and the indicator 24 associated therewith will indicate the highest current to denote the level of the surface of the liquid 12. To obtain a more definite indication a series of collimating shields 31 can be inserted between the tubes 23 such that the float 28 normally energizes a single detector 23 or at most two adjacent detectors when the float 28 is intersected by the plane of shield 31. Such an arrangement of the detectors would indicate the surface level of the liquid 12 by a single (or at most two adjacent) illuminated lamp 24.

Many modifications will now be apparent in the light of the above teachings which are merely exemplary. The scope of the invention is to be considered limited as defined in the appended claims.

I claim:

1. Radioactive radiation liquid level sensing means comprising, a source of radioactive radiation including beta radiation capable of transmission only a short distance through said liquid, elongated detector means selectively responsive to said beta radiation, means disposing said source means and said detector means in opposed generally parallel relation for detecting said beta radiations and spaced somewhat in excess of said distance of transmission of said beta radiation through said liquid, means for positioning said source means and said detector means other than horizontally in the container in which said liquid level is to be sensed, and circuit means for energizing said detector means and responsive in accordance with the radiation received by said detector means for indicating said liquid level.

2. Radioactive radiation liquid level sensing means comprising an elongated source of radioactive radiation including beta rays capable of transmission only a short distance through said liquid, a plurality of detectors selectively responsive to said beta radiation positioned one above another, means disposing said source and said detectors in opposed relation for detecting said beta radiations and spaced somewhat in excess of said distance, means for positioning said source and said detector other than horizontally in the container in which said liquid level is to be sensed, and circuit means for energizing said detectors and responsive to the individual detection of said beta radiation by said detectors.

3. Radioactive radiation liquid level sensing means comprising an elongated cage having a radioactive float confined therein and freely movable in the elongated direction, said float providing a source of beta radiation capable of transmission only a short distance through said liquid, a plurality of detectors selectively responsive to said beta radiation positioned one above the other, means disposing said cage and said detectors in generally parallel relation and spaced somewhat in excess of said distance, means for positioning said source and said detector other than horizontally in the container in which said liquid level is to be sensed and circuit means for energizing said detectors and responsive to the individual detection of said beta radiation by said detectors.

References Cited in the file of this patent
UNITED STATES PATENTS

| | | |
|---|---|---|
| 2,506,585 | Elliot | May 9, 1950 |
| 2,662,985 | Good | Dec. 15, 1953 |
| 2,674,695 | Grace | Apr. 6, 1954 |
| 2,714,167 | Herzog | July 26, 1955 |
| 2,734,136 | Atchison | Feb. 7, 1956 |
| 2,737,592 | Ohmart | Mar. 6, 1956 |